(12) United States Patent
Hofmann

(10) Patent No.: US 7,716,178 B2
(45) Date of Patent: May 11, 2010

(54) SYSTEMS AND METHODS FOR MONITORING DATABASE REPLICATION

(75) Inventor: Helmut Hofmann, Sandhausen (DE)

(73) Assignee: SAP AG, Walldorf (DE)

( * ) Notice: Subject to any disclaimer, the term of this patent is extended or adjusted under 35 U.S.C. 154(b) by 234 days.

(21) Appl. No.: 11/149,179

(22) Filed: Jun. 10, 2005

(65) Prior Publication Data

US 2006/0015485 A1 Jan. 19, 2006

(30) Foreign Application Priority Data

Jun. 15, 2004 (EP) .................................. 04013924

(51) Int. Cl.
*G06F 7/00* (2006.01)
*G06F 17/00* (2006.01)

(52) U.S. Cl. ..................... 707/616; 707/634; 707/687
(58) Field of Classification Search ................ 705/1; 707/1–10, 100, 101, 102, 104, 200, 201, 707/206; 709/224, 225, 217–219; 714/5–13
See application file for complete search history.

(56) References Cited

U.S. PATENT DOCUMENTS

| | | | | |
|---|---|---|---|---|
| 5,724,575 A | * | 3/1998 | Hoover et al. ................ 707/10 |
| 5,806,074 A | * | 9/1998 | Souder et al. ............... 707/201 |
| 6,004,276 A | * | 12/1999 | Wright et al. ............... 600/508 |
| 6,016,501 A | * | 1/2000 | Martin et al. ............... 707/203 |
| 6,058,401 A | | 5/2000 | Stamos et al. |
| 6,092,083 A | * | 7/2000 | Brodersen et al. ........... 707/201 |
| 6,122,630 A | * | 9/2000 | Strickler et al. ................ 707/8 |
| 6,178,425 B1 | * | 1/2001 | Brodersen et al. ........... 707/101 |
| 6,189,011 B1 | * | 2/2001 | Lim et al. .................... 707/102 |
| 6,202,070 B1 | * | 3/2001 | Nguyen et al. ........... 707/104.1 |
| 6,374,262 B1 | | 4/2002 | Kodama |
| 6,615,223 B1 | | 9/2003 | Shih et al. |
| 7,246,116 B2 | * | 7/2007 | Barsness et al. ................ 707/3 |
| 2002/0165724 A1 | * | 11/2002 | Blankesteijn .................. 705/1 |

OTHER PUBLICATIONS

"Centura SQLBase Exchange allows replication and data moving a ActiveX-component," Online Article, Jun. 9, 1998. retrieved from the Internet using Google cached version of <URL:http:/www.pr-com.de/Pri.nsf/0/996553551ec38f2f412566400336939?OpenDocument> (17 pages).
Robert Vermeulen, "Upgrading Relational Databases with Objects" SIGS Books, New York, USA, May 1997, pp. 90-91.
Office Action from the European Patent Office in Application No. 04 013924.8, dated Dec. 4, 2006 (6 pages).
Communication from the European Patent Office in Application No. 04 013 924.8-1527, dated Feb. 11, 2009, and attachments (45 pages).

* cited by examiner

*Primary Examiner*—Charles Rones
*Assistant Examiner*—Daniel Kuddus
(74) *Attorney, Agent, or Firm*—Finnegan, Henderson, Farabow, Garrett & Dunner, LLP

(57) ABSTRACT

Data processing systems and methods are provided that include a relational database and an application program that performs a data processing step on data belonging to a predefined entity stored in the relational database. The relational database and the application program may be linked by an interface that provides an intermediate layer for extracting a self-contained temporary table out of the relational database that contains the data belonging to a user selected entity. The disclosed systems and methods may be used for various data processing purposes, including monitoring database replication.

12 Claims, 6 Drawing Sheets

SYSTEMS AND METHODS FOR MONITORING DATABASE REPLICATION

This application is based upon and claims the benefit of priority from prior patent application EP 04013924.8, filed Jun. 15, 2004, the entire contents of which are expressly incorporated herein by reference.

BACKGROUND

I. Technical Field

The present invention generally relates to the field of data processing. More particularly, embodiments of the invention relate to systems and methods for monitoring database replication.

II. Background Information

The design of a relational database is typically based on a data model. A data model is a conceptual representation of the data structures that are required by a database. The data structures include the database tables, the relationships between data tables, and the rules that govern operations on the database tables. There are two major methodologies used to create a data model: the entity-relationship approach and the object model.

A relationship is an association between two or more database tables. Relationships are expressed by the data values of the primary and foreign keys of a database table. A primary key is a column or columns in a database table whose values uniquely identify each row in a table. A foreign key is a column or columns whose values are the same as the primary key of another table. The relationship is made between two relational database tables by matching the values of the foreign key of one database table with the values of the primary key in another. Keys are fundamental to the concept of relational databases because they enable tables in the database to be related with each other.

Traditionally, database tables are organized in the following way. For each entity, a set of tables stores information about the entity. These entities are to a large extent independent and typically there are maintenance transactions for each. For example, there can be entities like 'office' and 'employee'. 'Employee' would include several tables containing information such as, for example, address, employee ID, salary, job description, and manager. The entity 'office' would also comprise several tables containing information such as, for example, address, number of seats, building number, etc. 'Employee' could also contain a list of offices but 'offices' and 'employee' would normally be maintained separately.

The entity model is the basis for a large variety of tools and processes, such as view cluster maintenance, central master data management, and XML data interchange. With the advent of object oriented programming, the database table design centers more around objects rather than self-contained entities.

In the above example, the address that appears both in the 'employee' and the 'office' entity is modeled as a separate object. However, this does not constitute a traditional entity as it is not self-contained. The address is modeled in the database as a separate object used both by 'employee' and 'office'. However, from the point of view of an application program and the user interface, the address data needs to be provided as if it were an integrated part of the 'employee' or 'office' entities.

Due to this discrepancy between the logical view of the entities and the actual incorporation of the objects, the database tables designed to follow the new object oriented model cannot be used together with a large variety of tools developed for the traditional entity based model. For example, it is not possible to compile a set of tables for XML distribution of 'employees' as the tables used to store the addresses belong only partly to the 'employees' and, furthermore, do not have the table layout expected for tables belonging to 'employees'. There is therefore a need to bridge the gap between the traditional entity based data processing approach and the object oriented database layout that is adapted to the object oriented programming model.

In addition, it is often desirable to store copies of relational database tables at multiple sites in a distributed data processing system. Data replication is the process of maintaining multiple copies of a database table in a distributed data processing system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. Furthermore, data replication provides greater fault tolerance in the event of a server failure, since the multiple copies of the data object effectively become online backup copies if a failure occurs.

In general, there are two types of propagation methodologies for data replication, which are referred to as "synchronous" and "asynchronous" replication. Synchronous replication is the propagation of changes to all replicas of a data object within the same transaction as the original change to a copy of that data object. For example, if a change is made to a table at a first replication site by a transaction A, that change must be replicated to the corresponding tables at all other replication sites before the completion and commitment of transaction A. Thus, synchronous replication can be considered real-time data replication. In contrast, asynchronous replication can be considered "store-and-forward" data replication, in which changes made to a copy of a data object can be propagated to other replicas of that data object at a later time. The change to the replicas of the modified data object does not have to be performed within the same transaction as the original calling transaction.

Synchronous replication typically results in more overhead than asynchronous replication. For example, more time is required to perform synchronous replication since a transaction cannot complete until all replication sites have finished performing the requested changes to the replicated data object. Moreover, a replication system that uses real-time propagation of replication data is highly dependent upon system and network availability, and mechanisms must be in place to ensure this availability. Thus, asynchronous replication is more generally favored for non-critical data replication activities. Synchronous replication is normally employed only when application requires that replicated sites remains continuously synchronized.

One approach to data replication involves the exact duplication of database schemas and data objects across all participating nodes in the replication environment. If this approach is used in a relational database system, each participating site in the replication environment has the same schema organization for the replicated database tables and database objects that it maintains. If a change is made to one replica of a database table, that same change is propagated to all corresponding database tables to maintain the consistency of the replicated data. Since the same schema organization used the replicated data across all replication sites, the instructions used to implement the changes at all sites can be identical.

Generally, two types of change instructions have been employed in data replication systems. One approach involves the propagation of changed data values to each replication site. Under this approach, the new value for particular data objects are propagated to the remote replication sites. The corresponding data objects at the remote sites are thereafter replaced with the new values. A second approach is to use procedural replication. Under this approach, a database query language statement, such as a database statement in the Structured Query Language ("SQL"), is propagated instead of actual data values. The database statement is executed at the remote sites to replicate the changes to the data at the remote replication sites. Since all replication sites typically have the same schema organization and data objects, the same database statement can be used at both the original and remote sites to replicate any changes to the data.

U.S. Pat. No. 6,615,223 shows a method for data replication that includes procedures for adding, deleting and modifying replicated data, and for replicating conflict resolution.

U.S. Pat. No. 6,058,401 shows a method for data replication with conflict detection. The method aims to reduce overhead in data replication in a distributed system capable of detecting conflicts in replicated data.

U.S. Pat. No. 5,806,074 shows a method for configurable conflict resolution in a computer implemented distributed database. The method uses a conflict detection module for detecting a conflicting modification for corresponding portions of replicated data structures.

It is a common disadvantage of known replication solutions that they are not error free. Another problem regarding data consistency in a distributed data processing system is that conflicting changes to the data can be made at different sites. There is therefore a need for methods and systems for monitoring database replication for detecting such data inconsistencies.

SUMMARY

Consistent with an embodiment of the present invention, a data processing system is provided. The data processing system includes a relational database having a plurality of database tables. The database tables have a number of relationships and contain data belonging to a set of predefined entities. Each entity of the set of predefined entities has a predefined name. An application program processes the data belonging to a selected one of the predefined entities. An interface provides data belonging to the selected one of the predefined entities to the application program as a temporary table stored in volatile memory. The interface comprises a mapping table for assigning at least one of the plurality of database tables to one of the predefined entity names. The interface also comprises means for providing a list of the predefined entity names to the application program for the selection of the one of the predefined entities. The interface further comprises means for generating the temporary table containing the data belonging to the selected one of the predefined entities by reading the at least one of the plurality of database tables that is assigned to the entity name of the selected one of the predefined entities and the database tables that are related to the at least one of the plurality of the database tables.

In another embodiment consistent with the present invention, a distributed database system is provided that comprises at least a first replica and a second replica of data belonging to a set of predefined entities. The at least first and second replicas have a plurality of database tables. The database tables have a number of relationships. Each entity of the predefined set of entities has a predefined name. An application program monitors database replication with respect to data belonging to a selected one of the predefined entities. A first interface provides first data belonging to a selected one of the predefined entities to the application program as a first temporary table stored in volatile memory. A second interface provides second data belonging to the selected one of the predefined entities to the application program as a second temporary table stored in volatile memory. The application program detects a discrepancy between the first and second temporary tables and outputs a signal when a discrepancy is detected.

In another embodiment consistent with the present invention, a data processing method provides data belonging to a selected one of a set of predefined entities to an application program. The data is stored in a relational database having a plurality of database tables. The database tables have a number of relationships and the database tables contain the data belonging to the set of pre-defined entities. Each entity of the predefined set of entities has a predefined name. The method comprises providing a list of the predefined names to an application program for a user's selection of one of the predefined names. The user's selection is received. A mapping table is used that assigns at least one of the plurality of database tables to one of the predefined entity names to access the at least one of the plurality of database tables that is assigned to the selected one of the predefined entities. The at least one of the plurality of database tables is read that are related to the at least one of the plurality of database tables. A temporary table is generated containing the data belonging to the selected one of the predefined entities that has been obtained by reading the at least one of the plurality of database tables and its related tables. The temporary table is stored in volatile memory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
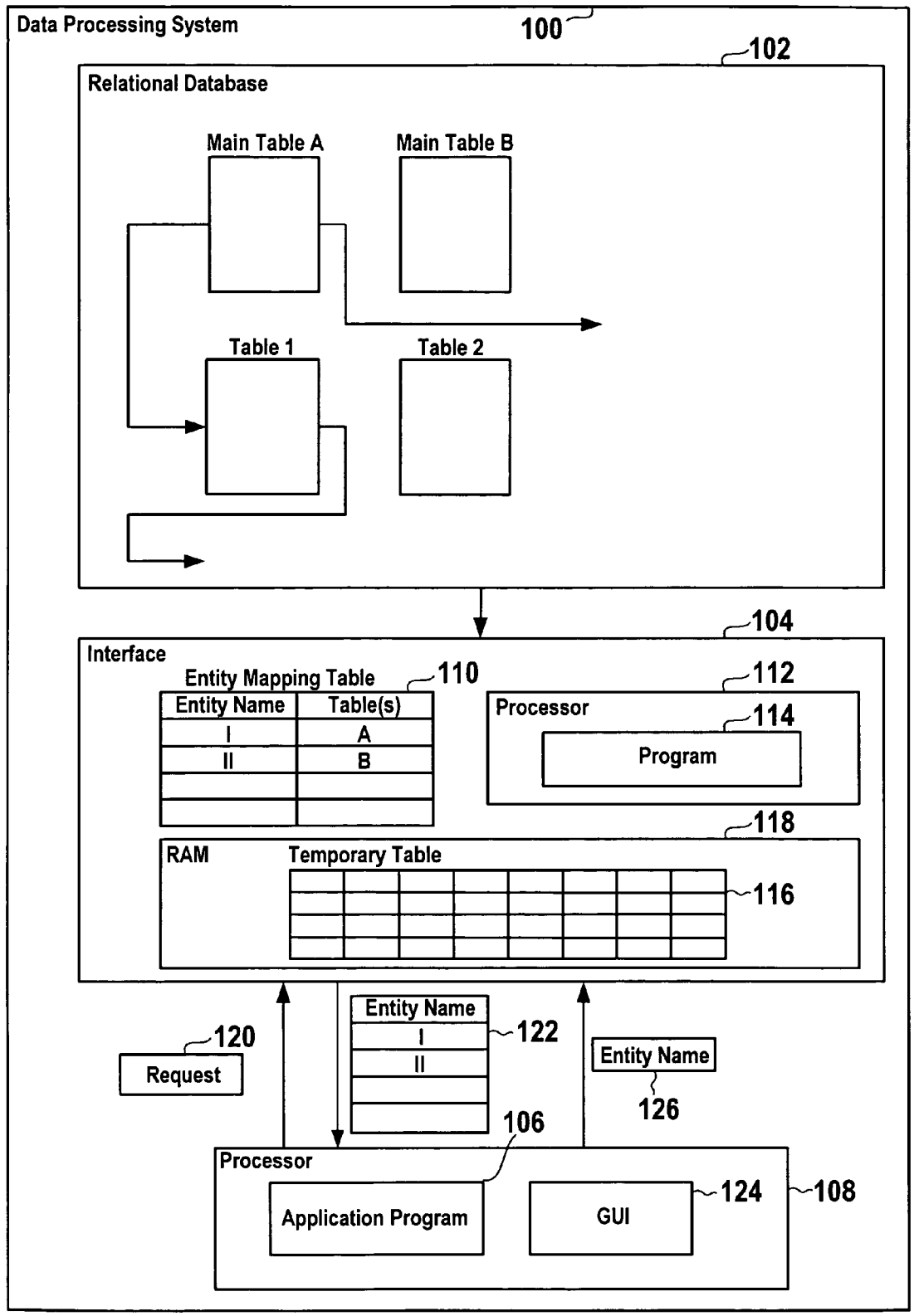
FIG. 1 is a block diagram of an embodiment of a data processing system consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Embodiments of the present invention relate to data processing systems and corresponding methods. In one embodiment, a relational database is provided with a plurality of database tables. The database tables have a number of relationships and contain data belonging to a set of pre-defined entities. Each entity of the pre-defined set of entities has a pre-defined name. Furthermore, an application program may be provided for processing data belonging to a selected one of the pre-defined entities. An interface acts as an immediate layer between the relational database and the application program for providing the data to the application program. The interface generates a temporary table that contains the data and stores the temporary table in volatile memory for access by the application program.

As disclosed herein, the interface may include a mapping table that assigns at least one of the plurality of database tables to one of the predefined entity names. In response to a request of the application program, the interface provides a list of the predefined entity names to the application program for selection of one of the predefined entities. In response to the selection of one of the predefined entities, the temporary table is generated by reading the at least one of the plurality of database tables assigned to the selected one of the predefined entity names in the mapping table and its related database tables, if any.

The resultant temporary table may contain all the data belonging to the selected entity without technical database keys that are not of interest to the requesting application program. This is particularly beneficial if the application program uses the entity oriented approach as the temporary table delivered by the interface is self-contained. This means that technical keys are eliminated from the temporary table and that all relationships between the database tables that contain the data of the selected entity have been resolved.

In accordance with an embodiment of the invention, the mapping table assigns a main table to one of the entity names. The main table is the root of one or more relationship paths that are resolved when the temporary table is generated. As an alternative, or in addition, the mapping table can explicitly assign a list of related database tables to one of the entity names.

In accordance with another embodiment of the invention, the temporary table is generated as a spreadsheet. For example, the spreadsheet has a tab for each of the database tables that has been used for the generation of the spreadsheet.

Embodiments of the present invention may also generate a self-contained temporary table containing all the data belonging to a logical entity that is stored in various database tables, which facilitates usage of application programs that require such an entity view on the data.

In another embodiment, the present invention relates to a distributed database system is provided that includes at least first and second replica of the data that belongs to a set of predefined entities. Each one of the replicas uses an interface to provide a respective temporary table containing data belonging to a selected one of the predefined entities. The data contained in the temporary tables is compared in order to detect any discrepancies.

In accordance with another embodiment of the invention, a replication procedure is invoked when a discrepancy is detected. For example, the detected discrepancy is signaled to a user for the user's review. The user can enter a correction in order to resolve the discrepancy. The correction is entered into the replication component for propagation of the correction to the replicas.

FIG. 1 shows an embodiment of a data processing system 100 that has relational database 102. Relational database 102 has a plurality of database tables, such as main table A, main table B, and table 1, table 2, etc. Relationships between the database tables are defined using primary and foreign keys.

In one embodiment consistent with the present invention, each main table constitutes the root node for one or more relationship paths to other database tables. For example, a relationship between main table A and table 1 is defined. Table 1 has a further relationship with another database table. As a consequence, a relationship path is defined from the main table A that includes one or more other database tables. Main table A can be the origin of a number of such relationship paths. The same applies analogously to the other main tables of the relational database 102. As further shown in FIG. 1, data processing system 100 may include an interface 104 in order to establish an intermediate layer between relational database 102 and an application program 106 that is executed by processor 108.

In accordance with an aspect of the invention, the data model that forms the basis for relational database 102 may be an object oriented model such that the data stored in the database tables is not grouped into self-contained entity tables but spread across various database tables that are linked by relationships. On the other hand, application program 106 requires a self-contained tabular input that contains all the data related to a selected entity. In order to perform the respective transformation, interface 104 includes entity mapping table 110.

All entities used in data processing system 100 may have predefined entity names. These entity names are listed in the left column of entity mapping table 110. Entity mapping table 110 assigns at least one database table to each entity name. This assignment enables the interface 104 to collect all the data stored in relational database 102 that belongs to a given entity.

For example, entity mapping table 110 explicitly lists all database tables for a given entity name that contain data belonging to that entity. Alternatively, or in addition, the entity mapping table 110 assigns a main table to the entity name. The relationships from the main table to other database tables along the defined relationship paths are resolved by reading the respective data and generating a temporary table containing all the data belonging to the entity.

In the example of FIG. 1, entity mapping table 110 assigns main table A to entity name I and entity mapping table B to entity name II, etc. Interface 104 includes a processor 112 for execution of a computer program 114. Program 114 can receive a request from the application program 106. In response to the request program 114 reads the list of entity names from entity mapping table 110 and provides the list to the application program 106. One of the entity names is selected and sent as a consecutive request 126 to the program 114. In response, the program 114 reads the one or more database tables assigned to the selected entity from entity mapping table 110 and reads the database tables belonging to that selected entity from the relational database 102. The data belonging to the selected entity that is read from relational database 102 is put into a temporary table 116 and stored in random access memory 118 of interface 104. By way of example, temporary table 116 can have the form of a spreadsheet having multiple tabs or it can be split into a number of separate tables.

In operation, application program 106 sends request 120 to interface 104. In response, program 114 reads the list of predefined entity names from entity mapping table 110. This list 122 is sent to application program 106. Application program 106 may display the list 122 on graphical user interface (GUI) 124 for a user's selection of one of the entity names. The user selected entity name is transmitted with a request 126 to interface 104.

In response, program 114 reads the technical key of the main table that is assigned to the selected entity name from entity mapping table 110. Program 114 reads the data contained in this main table and any tables that are related in order to generate temporary table 116 that only contains the data belonging to the selected entity name without any technical keys or foreign keys, thus having resolved all relationships between the involved database tables.

For example, if the user has selected entity I program 114 reads the technical key of main table A from entity mapping table 110 that is assigned to entity name I. Program 114 reads main table A from relational database 102 and all database tables that are related to main table A along the defined relationship paths. The user data contained in these database tables without any technical or foreign keys is stored in temporary table 116 which thus constitutes a self-contained table including all data belonging to the selected entity. This temporary table 116 is accessed by application program 106 in order to perform a data processing operation on the selected entity.

Figure 2:
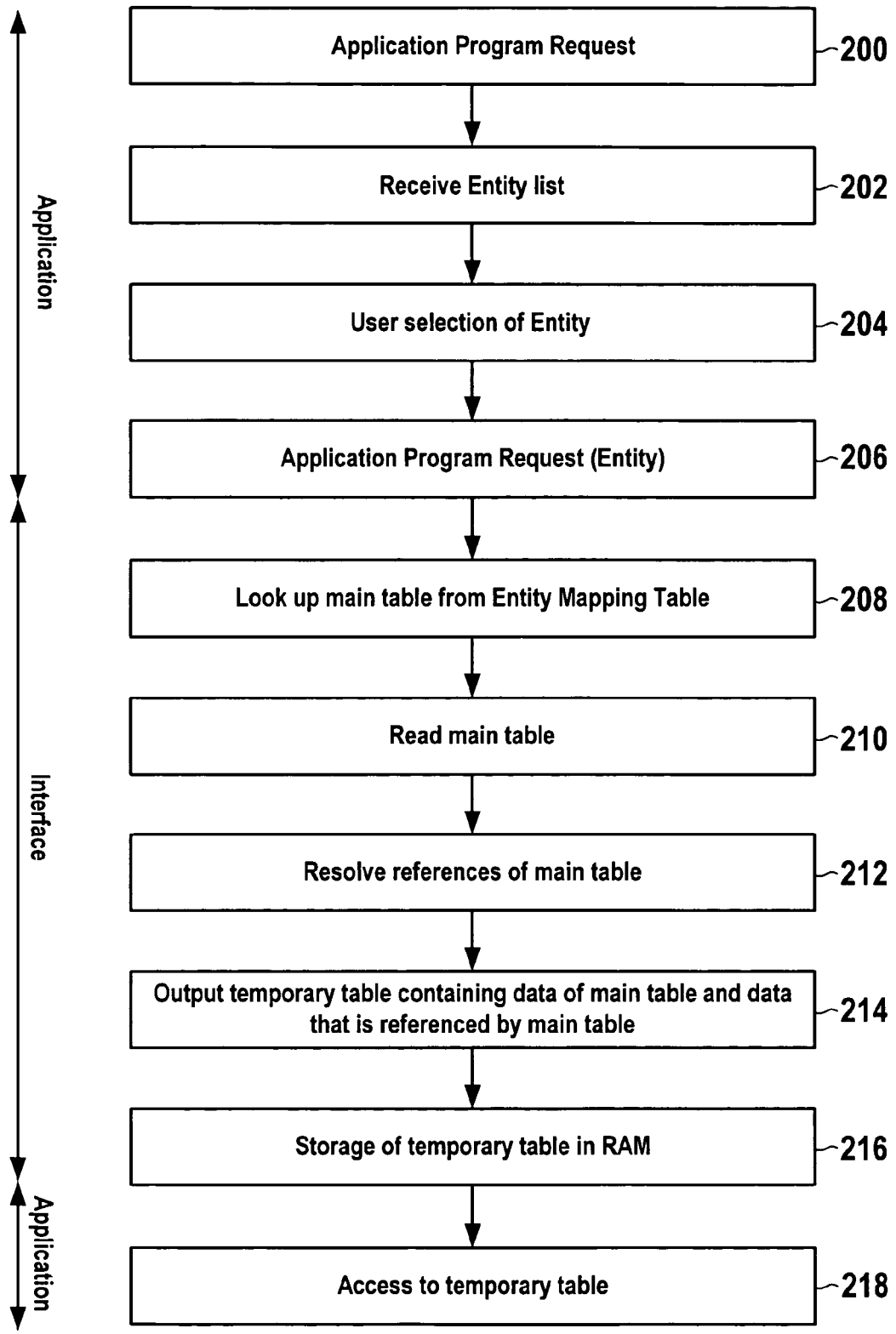
FIG. 2 illustrates a flow diagram of an embodiment of a method consistent with the present invention.

FIG. 2 shows a flowchart illustrating an embodiment of a method related to the operation of the data processing system 100 of FIG. 1. In step 200, the application program sends its request to the interface. In step 202, the application program receives the list of entity names from the interface in response to the request. In step 204, the user selects one of the entity names from the list and the application program sends a corresponding request containing the selected entity name to the interface in step 206.

In response to the request sent by the application program in step 206, the program of the interface looks up the main table that is assigned to the selected entity name from the entity mapping table (step 208). In step 210, the program reads the main table and, in step 212, references from the main table to other database tables are resolved. This may be performed by reading all database tables along the relationship paths that originate from the main table.

On this basis, the temporary table that contains only the user data but not the technical and foreign database keys is generated and output in step 214. The temporary table is stored in step 216 and accessed by the application program in step 218 in order to perform a data processing operation on the data of the selected entity.

Figure 3:
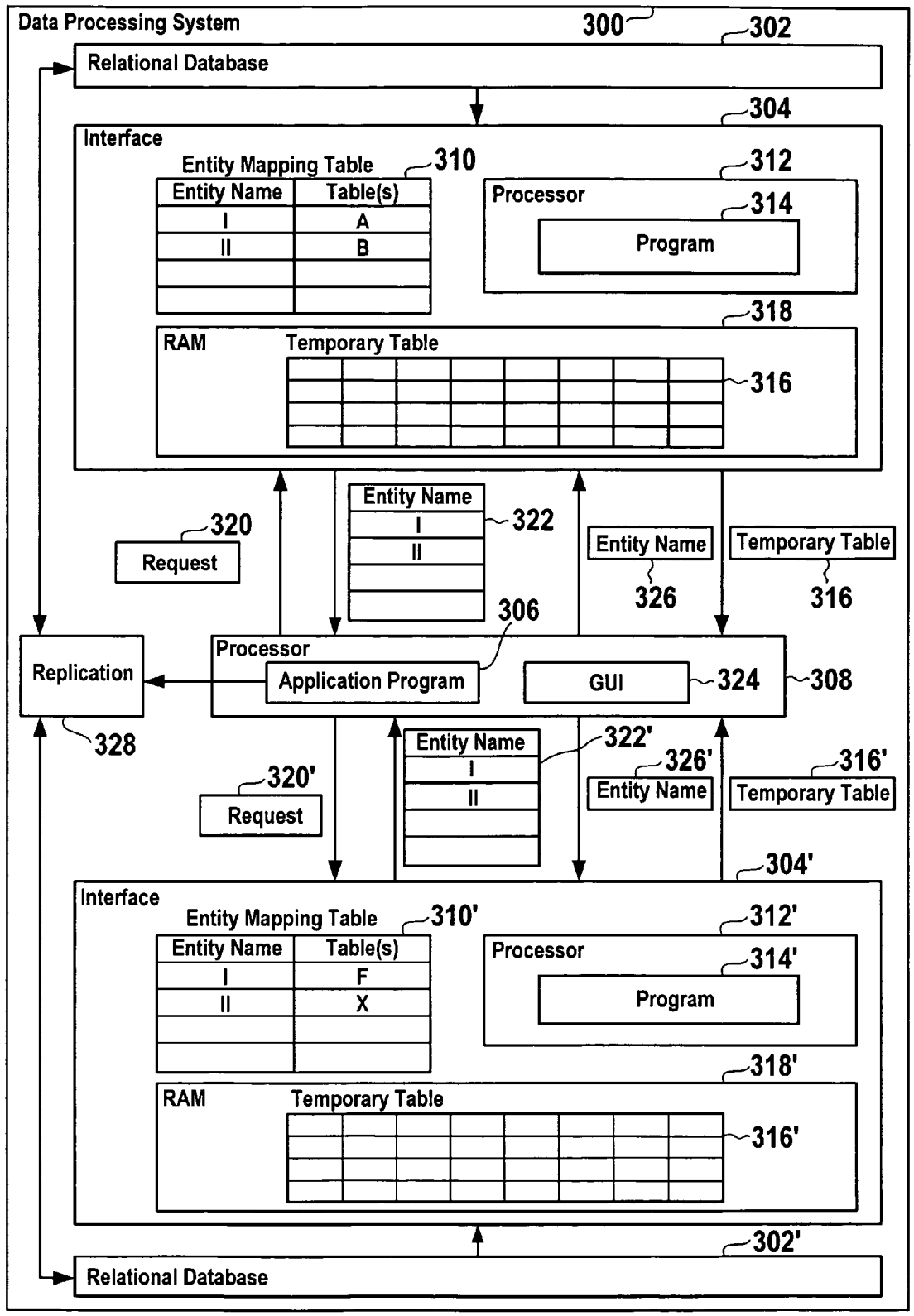
FIG. 3 is a block diagram of another embodiment of a data processing system having a replication component.

FIG. 3 shows a block diagram of another embodiment of a distributed data processing system 300. Elements in the embodiment of FIG. 3 that correspond to elements of the embodiment of FIG. 1 are designated by like reference numerals having added 200. The relational databases 302 and 302' are database replicas that are linked by a replication component 328. Replication component 328 can implement any known replication methodology.

Application program 306 is coupled to the relational databases 302 and 302' by interfaces 304 and 304', respectively. It is to be noted that relational databases 302 and 302' do not necessarily need to have the same database reference structure or the same technical keys but still contain substantially the same user data belonging to the pre-defined set of entities. Interfaces 304 and 304' are similar in design and correspond to interface 104 in the embodiment of FIG. 1. As the technical keys used in relational database 302' do not need to be identical to the keys used in relational database 303, entity mapping table 310' may differ from entity mapping table 310 as different technical keys are assigned to the entity names.

In operation, application program 306 sends requests 320 and 320' to interface 304 and 304', respectively. In response, application program 306 receives list 322 of the predefined entity names from interface 304 and a respective list 322' from interface 304'. Application program 306 determines the cut set of the lists 322 and 322', i.e., those entity names that are contained in both lists. The cut set of entity names is displayed on graphical user interface 324 for a user's selection of one of the entity names.

The user selected entity name is transmitted with request 326 to interface 304 and with request 326' to interface 304'. In response, temporary tables 316 and 316' are generated and provided to the application program 306 that compares the temporary tables 316 and 316'. If a discrepancy or conflict between the two temporary tables 316 and 316' is detected, this is signaled from application program 306 to the user by means of the graphical user interface 324.

The user can review the detected discrepancy and enter a correction. The correction is entered into replication component 328 by application program 306. The replication component 328 propagates the correction to the replicas i.e. relational databases 302 and 302'.

Figure 4:
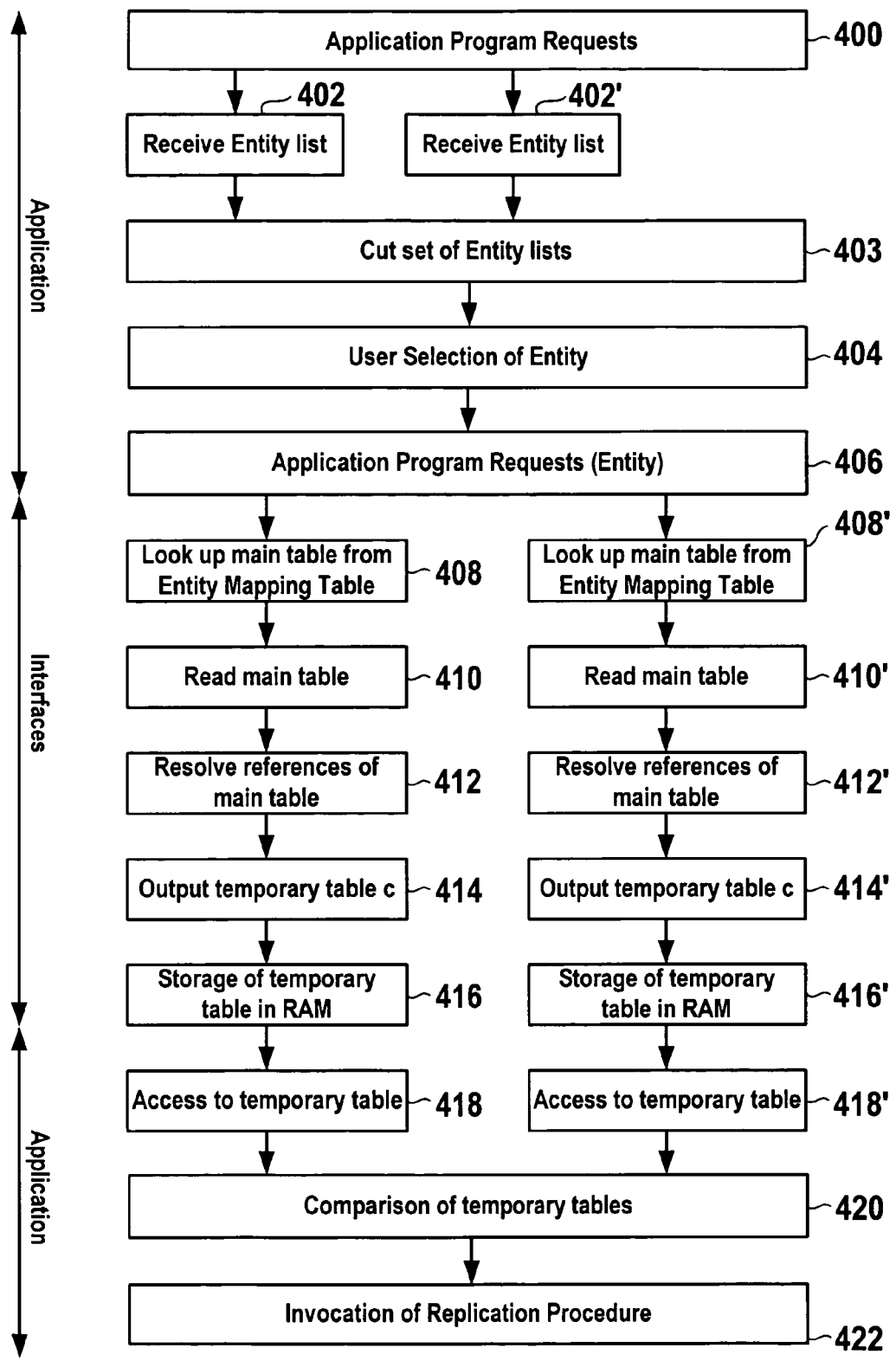
FIG. 4 is a flow chart of an embodiment of a method related to the operation of the data processing system of FIG. 3.

FIG. 4 shows a flow chart illustrating an embodiment of a method related to the operation of the data processing system 300 of FIG. 3. Steps in the flow chart of FIG. 4 that correspond to steps in the flow chart of FIG. 2 are designated by like reference numerals having added 200.

In step 400, the application program sends its request to the interfaces of the database replicas. In response it receives the respective lists of pre-defined entity names from the database replicas in steps 402, 402', etc.

In step 403, the application program determines the cut set of the lists of entity names that it has received from the interfaces of the database replicas. In step 404, a user selects one of the entity names from the cut set and the application program sends a request carrying the selected entity name to the interfaces in step 406. Next, steps 408 to 418 are performed by the interface 304 and steps 408' to 418' are performed by the interface 304', etc. The resultant temporary tables are compared in step 420 for detection of any discrepancies. After entry of a correction of a detected discrepancy, a replication procedure is invoked in step 422 to propagate the correction to the replicas.

Figure 5:
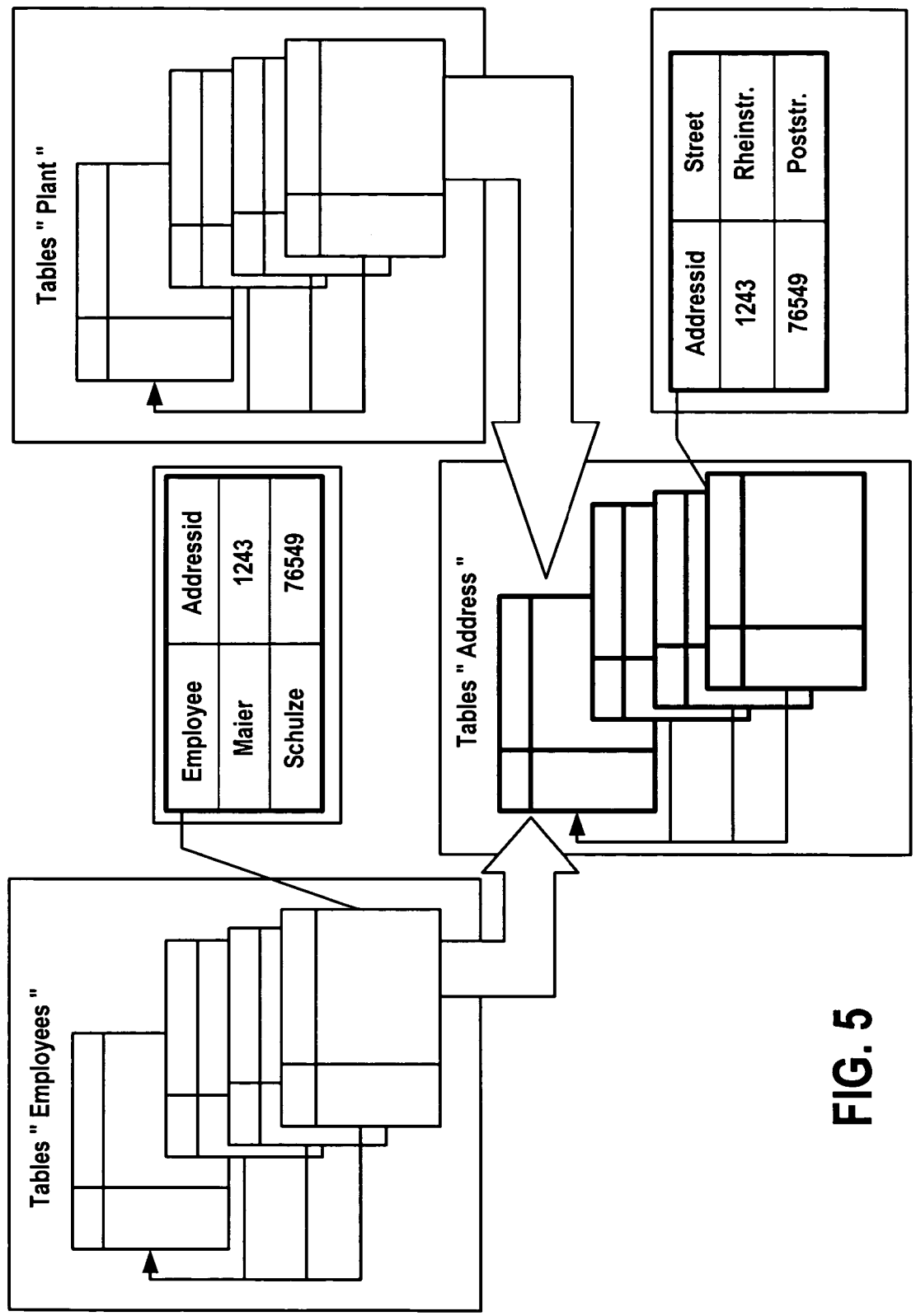
FIG. 5 is an example of database tables and their relationships.

FIG. 5 shows an example of a number of database tables that may be stored in a relational database, e.g. in the relational database 102 in the embodiment of FIG. 1 or in the relational database 302 of the embodiment of FIG. 3. The relational database stores a number of database tables for the entity type 'employees'. For example, each database table of the entity type 'employees' has a column containing employee names and a column for storing an address ID for each of the employee names. The address ID is a technical key that relates an entry in the database table for 'employees' to an entry in a database table of the entity type 'address'. Likewise, entries in the database tables of entity type 'client' that are stored in the relational database refer to entries in the database tables of entity type 'address' using the address ID as a technical key.

The arrows shown in FIG. 5 illustrate the foreign key relationships. The thin lines and thin arrows symbolize the foreign key relationships of database tables having the same entity type whereas the thick lines and arrows symbolize the foreign key relationships between entity types.

Figure 6:
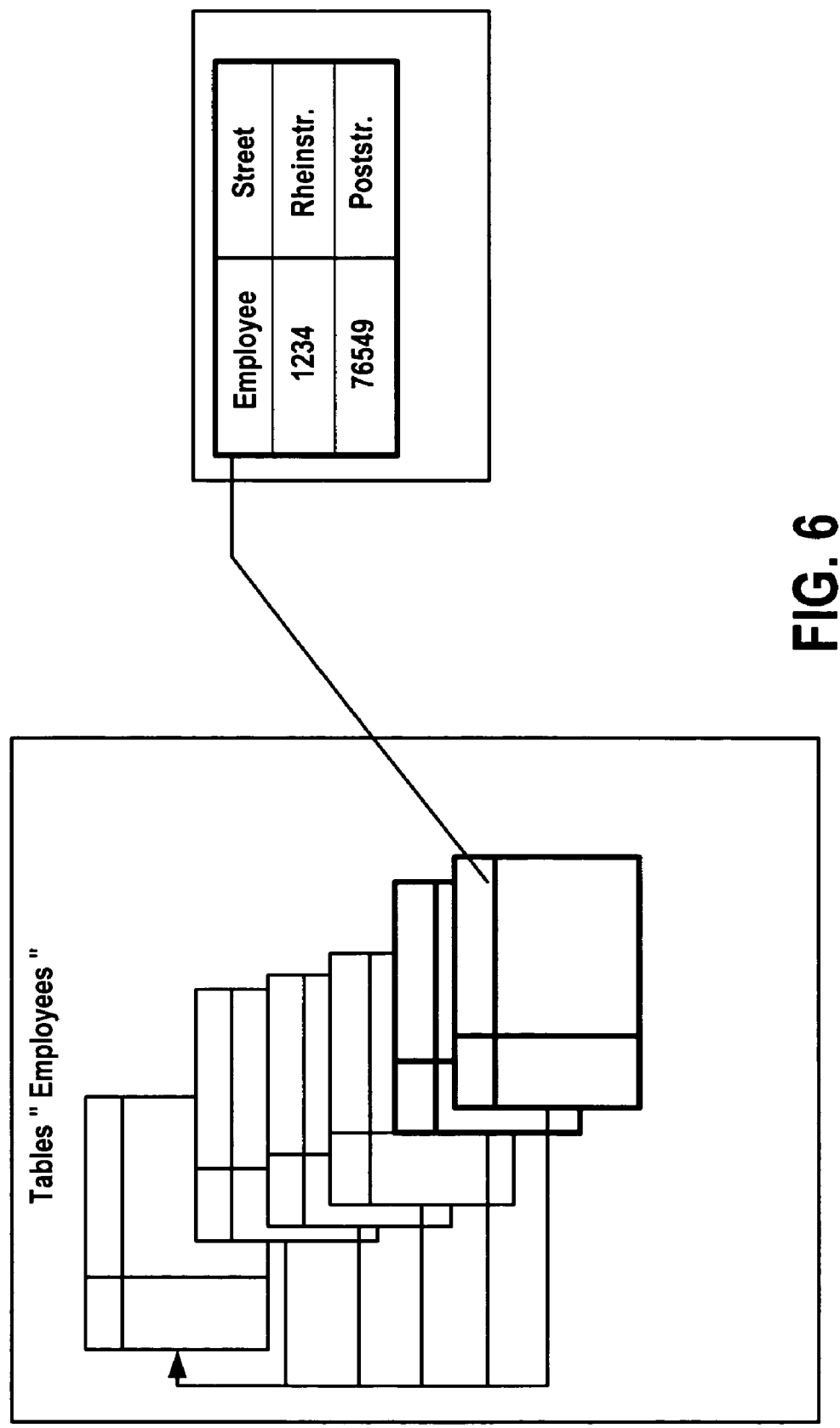
FIG. 6 is an example of a temporary table in which technical keys have been eliminated.

FIG. 6 illustrates an example of a temporary table where technical keys have been resolved such that the resulting database table contains all the information of interest of the employees, but without technical keys and references that are of no interest for the following data processing to be performed by an application program. In the example of FIG. 6, the address ID has been resolved such that the resultant database table contains an explicit indication of the street rather than an address ID.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system, comprising:
a processor;
a relational database comprising database tables and relationships among the database tables, the database tables containing data belonging to a set of predefined entities, wherein each entity of the set of predefined entities has a predefined name;
an application program, executed by the processor, configured to process the data belonging to a selected one of the predefined entities; and
an interface configured to provide the data belonging to the selected predefined entity to the application program as a self-contained temporary table stored in volatile memory, the interface comprising:
a mapping table listing a main table, and configured to assign the main table to the selected predefined entity, the main table including data belonging to the selected predefined entity, and wherein the main table is a root of relationship paths among related tables that relate to the selected predefined entity;
means for receiving a first request from the application program, and, in response to the first request, for providing, from the mapping table, a list of the predefined entity names to the application program for display and for user selection of the selected predefined entity;
means for receiving a second request including the selected predefined entity; and
means for generating, in response to the second request, the self-contained temporary table, as a spreadsheet, by reading the main table from the mapping table into a first tab of the spreadsheet, resolving the relationship paths in the main table to locate the related tables, and reading the related tables into additional tabs of the spreadsheet, wherein the spreadsheet includes a different tab for each database table of the plurality of database tables that contains data belonging to the selected one of the predefined entities.

2. The data processing system of claim 1, wherein the plurality of database tables comprise main tables, and at least one of the main tables is assigned to one of the predefined entity names in the mapping table.

3. The data processing system of claim 2, wherein the means for generating the temporary table is configured to resolve all relationships of the main table.

4. The data processing system of claim 1, wherein a set of the plurality of database tables are assigned to one of the predefined entity names and the mapping table.

5. A distributed database system, comprising:
a processor;
at least a first replica and a second replica of data belonging to a set of predefined entities, the at least first and second replicas including database tables and relationships among the database tables, and wherein each entity of the predefined set of entities has a predefined name;
an application program, executed by the processor, for monitoring database replication with respect to data belonging to a selected one of the predefined entities;
a first interface for generating a first self-contained temporary table as a first spreadsheet stored in volatile memory, by reading one first main table assigned to a selected entity listed in a mapping table into a first tab of the first spreadsheet, and reading first related tables related to the first main table into additional tabs of the first spreadsheet by resolving relationships specified in the first main table to locate the first related tables, wherein the first main table is a root of relationship paths among the first related tables that relate to the selected entity, and wherein the first interface provides the first temporary table to the application program;
a second interface for generating a second self-contained temporary table as a second spreadsheet stored in volatile memory, by reading one second main table assigned to the selected entity listed in the mapping table into a first tab of the second spreadsheet, and reading second related tables related to the second main table into additional tabs of the second spreadsheet by resolving relationships specified in the second main table to locate the second related tables, wherein the second main table is a root of relationship paths among the second related tables that relate to the selected entity, and wherein the second interface provides the second temporary table to the application program, wherein the application program detects a discrepancy between the first and second temporary tables and outputs a signal when a discrepancy is detected; and a replication component configured to receive a correction of the discrepancy in response to the signal, and to propagate the correction to the at least first and second replicas.

6. The distributed database system of claim 5, wherein:
the application program is further configured to determine a cut set of a first set of predefined names of a respective first set of entities supported by the first interface and a second set of predefined names of a respective second set of entities supported by the second interface for a user's selection of one of the names contained in the cut set.

7. A data processing method for providing data belonging to a selected one of a set of predefined entities to an application program, the data being stored in a relational database comprising database tables and relationships among the database tables, the database tables containing the data belonging to the set of pre-defined entities, and each entity of the pre-defined set of entities has a predefined name, the method comprising:

providing a list of the predefined names to an application program for a user's selection of one of the predefined names;

receiving the user's selection;

accessing a mapping table listing a main table that assigns the main table to a selected one of the predefined entity names, the main table including data belonging to the selected predefined entity name, and wherein the main table is a root of relationship paths among related tables that relate to the selected predefined entity name;

generating, by a processor, a self-contained temporary table, as a spreadsheet, by reading the main table from the mapping table into a first tab of the spreadsheet, resolving the relationship paths in the main table to locate the related tables, and reading the related tables into additional tabs of the spreadsheet, wherein the spreadsheet includes a different tab for each database table of the plurality of database tables that contains data belonging to the selected one of the predefined entities; and storing the temporary table in volatile memory.

8. The data processing method of claim 7, wherein the relationships between the tables are established by foreign keys.

9. The data processing method of claim 7, wherein the mapping table assigns a set of the plurality of database tables to one of the predefined entity names.

10. The data processing method of claims 7, wherein the mapping table assigns at least one main table of the plurality of database tables to at least one of the predefined entity names.

11. A computer-readable storage medium comprising a computer program product stored thereon and executed by a computer system, causing the computer system to perform instruction of:

providing a list of predefined names to an application program for a user's selection of one of the predefined names;

receiving the user's selection;

accessing a mapping table listing a main table that assigns the main table to a selected one of the predefined entity names, wherein the main table is a root of relationship paths among related tables that relate to the selected predefined entity;

generating a self-contained temporary table, as a spreadsheet, by reading the main table from the mapping table into a first tab of the spreadsheet, resolving the relationship paths in the main table to locate the related tables, and reading the related tables into additional tabs of the spreadsheet, wherein the spreadsheet includes a different tab for each database table of the plurality of database tables that contains data belonging to the selected one of the predefined entities; and storing the temporary table in volatile memory.

12. A method for monitoring database replication of at least first and second replica of a distributed database system, the at least first and second replica containing data belonging to a set of predefined entities, at least a first replica and a second replica of data belonging to a set of predefined entities, the at least first and second replicas having database tables and relationships among the database tables, each entity of the predefined set of entities having a predefined name, the method comprising:

monitoring database replication with respect to data belonging to a selected one of the predefined entities;

generating a first self-contained temporary table as a first spreadsheet stored in volatile memory, by reading one first main table assigned to a selected entity listed in the mapping table into a first tab of the first spreadsheet, and reading first related tables related to the first main table into additional tabs of the first spreadsheet by resolving relationships specified in the first main table to locate the first related tables, wherein the first main table is a root of relationship paths among the related tables that relate to the selected entity;

generating a second self-contained temporary table as a second spreadsheet stored in volatile memory, by reading one second main table assigned to the selected entity listed in the mapping table into a first tab of the second spreadsheet, and reading second related tables that are related to the second main table into additional tabs of the second spreadsheet by resolving relationships specified in the second main table to locate the second related tables, wherein the first main table is a root of relationship paths among the second related tables that relate to the selected entity;

searching, by a processor, a discrepancy between the first and second temporary tables and outputting a signal when the discrepancy is detected;

receiving a correction of the discrepancy in response to the signal, and invoking a replication component in response to the entry of the correction for propagation of the correction to the at least first and second replicas.

* * * * *